United States Patent
Zhou et al.

(10) Patent No.: US 11,567,161 B2
(45) Date of Patent: Jan. 31, 2023

(54) METHOD FOR ESTIMATING THE DIRECTION-OF-ARRIVAL OF A COPRIME ARRAY BASED ON VIRTUAL DOMAIN STATISTICS RECONSTRUCTION OF SINGLE-BIT QUANTIZED SIGNAL

(71) Applicant: ZHEJIANG UNIVERSITY, Zhejiang (CN)

(72) Inventors: Chengwei Zhou, Zhejiang (CN); Zhiguo Shi, Zhejiang (CN); Jiming Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/291,993

(22) PCT Filed: Nov. 3, 2020

(86) PCT No.: PCT/CN2020/126017
§ 371 (c)(1),
(2) Date: May 6, 2021

(87) PCT Pub. No.: WO2021/248792
PCT Pub. Date: Dec. 16, 2021

(65) Prior Publication Data
US 2022/0179031 A1    Jun. 9, 2022

(30) Foreign Application Priority Data

Jun. 8, 2020 (CN) .......................... 202010515235.X

(51) Int. Cl.
*G01S 3/14* (2006.01)
*H04B 7/08* (2006.01)

(52) U.S. Cl.
CPC ................ *G01S 3/14* (2013.01); *H04B 7/086* (2013.01)

(58) Field of Classification Search
CPC .................................. G01S 3/14; H04B 7/086
See application file for complete search history.

(56) References Cited

U.S. PATENT DOCUMENTS

2003/0058153 A1    3/2003    Yu

FOREIGN PATENT DOCUMENTS

| CN | 102608565 | 7/2012 |
| CN | 107102291 | 8/2017 |

(Continued)

OTHER PUBLICATIONS

C. Liu and P. P. Vaidyanathan, "One-bit sparse array DOA estimation," 2017 IEEE International Conference on Acoustics, Speech and Signal Processing (ICASSP), 2017, pp. 3126-3130, doi: 10.1109/ICASSP.2017.7952732. (Year: 2017).*

(Continued)

*Primary Examiner* — Cassi J Galt
(74) *Attorney, Agent, or Firm* — JCIP Global Inc.

(57) ABSTRACT

The invention discloses a method for estimating the direction-of-arrival of a coprime array based on virtual domain statistics reconstruction of single-bit quantized signal. The realization steps are as follows: arranging a coprime array and a single-bit analog-to-digital converter at a receiving end; calculating equivalent virtual signal corresponding to a single-bit receipt signal of the coprime array; constructing a virtual domain augmented covariance matrix of an initialized single-bit quantized signal; designing, based on statistical correlation analysis between statistics of the single-bit quantized signal and the original unquantized signal, an optimization problem based on virtual domain statistics reconstruction of quantized signal; and performing direction-of-arrival estimation by utilizing the virtual domain augmented covariance matrix corresponding to the optimized single-bit quantized signal.

6 Claims, 2 Drawing Sheets

(56) References Cited

FOREIGN PATENT DOCUMENTS

| | | |
|---|---|---|
| CN | 107302391 | 10/2017 |
| CN | 107329108 | 11/2017 |
| CN | 107561484 | 1/2018 |
| CN | 107589399 | 1/2018 |
| CN | 109507636 | 3/2019 |
| CN | 109582919 | 4/2019 |
| CN | 111665468 | 9/2020 |

OTHER PUBLICATIONS

Meng, Zhen, and Weidong Zhou. "Direction-of-Arrival Estimation in Coprime Array Using the ESPRIT-Based Method." Sensors (Basel, Switzerland) vol. 19,3 707. Feb. 9, 2019, doi:10.3390/s19030707 (Year: 2019).*

"International Search Report (Form PCT/ISA/210) of PCT/CN2020/126017," dated Feb. 25, 2021, pp. 1-5.

* cited by examiner

METHOD FOR ESTIMATING THE DIRECTION-OF-ARRIVAL OF A COPRIME ARRAY BASED ON VIRTUAL DOMAIN STATISTICS RECONSTRUCTION OF SINGLE-BIT QUANTIZED SIGNAL

CROSS-REFERENCE TO RELATED APPLICATION

This application is a 371 of international application of PCT application serial no. PCT/CN2020/126017, filed on Nov. 3, 2020, which claims the priority benefit of China application no. 202010515235.X, filed on Jun. 8, 2020. The entirety of each of the above mentioned patent applications is hereby incorporated by reference herein and made a part of this specification.

FIELD OF TECHNOLOGY

The invention relates to the technical field of signal processing, and in particular to low-cost and high-efficiency direction-of-arrival estimation of radar signals, acoustic signals and electromagnetic signals. In particular, it relates to a method for estimating the direction-of-arrival of a coprime array based on virtual domain statistics reconstruction of single-bit quantized signal, which can be used for passive positioning, target detection and a new generation of wireless communication system.

BACKGROUND

Direction-of-Arrival Estimation is one of the basic problems in the field of array signal processing, which is widely used in radar, sonar, voice, radio astronomy, seismology, wireless communication, medical imaging and other fields, by using array antenna to receive spatial signals and processing the receipt signals through statistical signal processing technology and various optimization methods to restore the direction-of-arrival information contained in the signal.

With the continuous increase of user demand and data scale, large-scale antenna deployment at the base station is one of the typical features in the new generation of wireless communication systems. At the same time, with the popularization and application of channel modeling theory in angle domain in millimeter wave Massive MIMO (Massive Multiple-Input Multiple-Output) system, the traditional direction-of-arrival estimation is facing huge technical challenges. On the one hand, the traditional direction-of-arrival estimation is limited by Nyquist sampling rate, and its degree of freedom (that is, the number of incident signal sources that can be distinguished) is determined by the number of antenna elements, but the increase of the number of users will be much higher than the increase of the number of antennas at the base station. Therefore, when the number of incident signal sources in a certain airspace is greater than or equal to the number of antenna elements in the array, the existing uniform array method will not be able to perform effective direction-of-arrival estimation. On the other hand, with the increase of the number of antennas, large-scale antenna systems are under great pressure from deployment cost, operation power consumption and calculation data, which leads to great pressure and challenges in practical application.

In order to solve the above problems, sparse array makes it possible to perform effective direction-of-arrival estimation under the condition of undersampling. Besides, as a sparse array with systematic structure, coprime array can use the same number of antenna elements to obtain more degrees of freedom, so as to break through the performance bottleneck of degrees of freedom, and has received unprecedented attention in the field of direction-of-arrival estimation. However, the existing methods for estimating the direction-of-arrival of a coprime array are generally premised on the idealized signal sampling quantization process, which is obviously impossible in practical system application, and the quantization error caused by the finite precision quantization process will be inevitable. On the other hand, with the development of massive MIMO technology, with the deployment of low-bit Analog-to-Digital Converter (ADC) at the antenna end of base station, the system cost, operating power consumption, data scale and computational complexity are reduced at the expense of some performance, and single-bit quantization is an example of the above methods with the lowest precision. However, existing single-bit massive MIMO systems generally adopt uniform arrays, which has the bottleneck problem of limited degree of freedom.

To sum up, the integration of sparse array and single-bit quantization technology is an effective method to solve the problems of limited degree of freedom, high deployment cost, large power consumption, large data volume and high computational complexity in existing massive MIMO systems. Although scholars throughout the world have begun to explore the core technology of integration of sparse array and single-bit quantization technology, the research of single-bit direction-of-arrival estimation for coprime array is still in its infancy, and the statistical and technical characteristics of signal processing in virtual domain of coprime array have not been fully explored and applied. Therefore, how to make full use of the advantages of the virtual domain signal processing of the coprime array, solve the performance loss and model mismatch problems caused by the discontinuity of the virtual array, realize the high-efficiency direction-of-arrival estimation of the single-bit quantized signal, minimize the performance loss compared with the original unquantized signal, and even use its sparse characteristics to achieve performance surpassing, is an important problem that needs to be solved urgently.

SUMMARY

The object of the present invention is: to provide a method for estimating the direction-of-arrival of a coprime array based on virtual domain statistics reconstruction of single-bit quantized signal, and to explore the correlation between its virtual domain statistics and traditional unquantized signal virtual domain statistics by modeling the single-bit quantized signal of coprime array and its second-order statistics; then, to provide an optimization method based on virtual domain statistics reconstruction of quantized signal to realize the effective utilization of all signals of non-uniform virtual array; finally, to perform direction-of-arrival estimation based on the reconstructed virtual domain augmented covariance matrix of single-bit quantization signal, to realize the integration of the advantages of coprime array signal processing and single-bit quantized signal processing, thereby fundamentally improving the comprehensive performance of direction-of-arrival estimation and providing technical support for its application in the new generation of massive MIMO systems and other fields.

The object of the present invention is realized by the following technical scheme: a method for estimating the direction-of-arrival of a coprime array based on virtual domain statistics reconstruction of single-bit quantized signal, comprising the following steps:

(1) arranging a coprime array $\mathbb{S}$ at a receiving end using M+N−1 antennas, each array element of the coprime array being connected with a single-bit analog-to-digital converter for single-bit quantization of receipt signal, wherein M and N are coprime integers;

(2) modeling a single-bit receipt signal of the coprime array: assuming that there are K far-field narrowband incoherent signal sources from directions $\theta_1, \theta_2, \ldots, \theta_K$, receiving an incident signal by adopting the coprime array and the single-bit analog-to-digital converter constructed in step (1), and obtaining the single-bit receipt signal $y(l) \in \mathbb{C}^{M+N-1}$ of the coprime array at the lth time, wherein the modeling is $$y(l) = Q(x(l)) = Q\left(\sum_{k=1}^{K} a_{\mathbb{S}}(\theta_k)s_k(l) + n_{\mathbb{S}}(l)\right),$$

wherein, $Q(\cdot)$ is a single-bit quantization operator, $x(l)$ is an unquantized original receipt signal of the coprime array, $s_k(l)$ is a waveform of a $k^{th}$ signal, $n_{\mathbb{S}}(l)$ is a noise item independent of each signal source, and $a_{\mathbb{S}}(\theta_k)$ is a steering vector of the coprime array $\mathbb{S}$ corresponding to the direction $\theta_k$, expressed as $$a_{\mathbb{S}}(\theta_k) = [1, e^{-j\pi u_2 \sin(\theta_k)}, \ldots, e^{-j\pi u_{M+N-1} \sin(\theta_k)}]^T,$$

wherein, $u_i$, i=1, 2, . . . , M+N−1 represents an actual position of the $i^{th}$ physical antenna element in the coprime array, and $u_j = 0$, $j = \sqrt{-1}$, $[\cdot]^T$ represents a transposition operation, and a sampling covariance matrix $\hat{Q}_{\mathbb{S}}$ of the single-bit receipt signal of the coprime array is obtained by using collected L sampling snapshots, expressed as $$\hat{Q}_{\mathbb{S}} = \frac{1}{L}\sum_{l=1}^{L} y(l)y^H(l),$$

wherein $(\cdot)^H$ represents conjugate transpose;

(3) calculating an equivalent virtual signal corresponding to the single-bit receipt signal of the coprime array: vectorizing the sampling covariance matrix $\hat{Q}_{\mathbb{S}}$ of the single-bit receipt signal of the coprime array, and obtaining the equivalent receipt signal $\hat{q}_{\mathbb{D}}$ of a virtual array corresponding to the single-bit quantized signal, expressed as $$\hat{q}_{\mathbb{D}} = vec(\hat{Q}_{S}) = \frac{2}{\pi}\left(\arcsin\left(\left(\Sigma^{-\frac{1}{2}} \otimes \Sigma^{-\frac{1}{2}}\right)\mathcal{R}(r_{\mathbb{D}})\right) + j \cdot \arcsin\left(\left(\Sigma^{-\frac{1}{2}} \otimes \Sigma^{-\frac{1}{2}}\right)\mathcal{T}(r_{\mathbb{D}})\right)\right),$$

corresponding to a non-uniform virtual array, $$\mathbb{D} = \{v_i - v_j | v_i, v_j \in \mathbb{S}\},$$

wherein, $vec(\cdot)$ represents a vectorization operation, that is, columns in the matrix are stacked in sequence to form a new vector, $\Sigma = diag(R_{\mathbb{S}})$, $R_{\mathbb{S}} = E[x(l)x^H(l)]$ is the covariance matrix of the receipt signal of a unquantized original coprime array, $diag(\cdot)$ represents operation of taking diagonal elements to form a diagonal matrix, $E[\cdot]$ represents taking expectation operation, $\otimes$ represents Kronecker product, $\mathcal{R}(\cdot)$ represents taking real part operation, $\mathcal{T}(\cdot)$ represents taking imaginary part operation, $$r_{\mathbb{D}} = \sum_{k=1}^{K} \sigma_k^2 a_{\mathbb{D}}(\theta_k) + \sigma_n^2 vec(I),$$

wherein, $\sigma_k^2$ represents power of the $k^{th}$ signal source, $\sigma_n^2$ represents noise power, I is an identity matrix, $a_{\mathbb{D}}(\theta_k)$ is a steering vector of a non-uniform virtual array $\mathbb{D}$ corresponding to the direction $\theta_k$, and is calculated as $a_{\mathbb{D}}(\theta_k) = a^*_{\mathbb{S}}(\theta_k) \otimes a_{\mathbb{S}}(\theta_k)$, wherein $(\cdot)^*$ is a conjugate operation;

(4) constructing a virtual domain augmented covariance matrix of an initialized single-bit quantized signal: in order to overcome a signal model mismatch problem caused by the non-uniform virtual array $\mathbb{D}$ of the coprime array, constructing a virtual domain uniform linear array $\mathbb{U}$ with a same aperture as a positive half axis of the non-uniform virtual array $\mathbb{D}$ and a spacing d, wherein the unit spacing d is half of the wavelength of incident narrowband signal, expressed as $$\mathbb{U} = \{ud | u = 0, 1, 2, \ldots, \max(\mathbb{D})/d\},$$

wherein, $\max(\cdot)$ represents an operation of taking the set maximum, correspondingly, the equivalent virtual signal $\hat{q}_{\mathbb{U}} \in \mathbb{C}^{|\mathbb{U}|}$ corresponding to the virtual domain uniform linear array is obtained by the following method: for the equivalent virtual signal corresponding virtual array element position corresponding to $\hat{q}_{\mathbb{U}}$, if the virtual array element position is included in the non-uniform virtual array $\mathbb{D}$, the equivalent virtual signal at this position is the same as a virtual signal corresponding to the corresponding virtual array element position in $\hat{q}_{\mathbb{D}}$; the equivalent virtual signal corresponding to discontinuous virtual array elements in the remaining non-uniform virtual arrays $\mathbb{D}$ are set to zero, and then virtual domain augmented covariance matrix of the initialized single-bit quantized signal can be constructed as $$\hat{Q}_{\mathbb{U}} = Toep(\hat{q}_{\mathbb{U}}),$$

wherein, $Toep(\cdot)$ represents that a vector taken is the first column of the Hermitian Toeplitz matrix;

(5) designing, based on statistical correlation analysis between statistics of the single-bit quantized signal and the original unquantized signal, an optimization problem based on virtual domain statistics reconstruction of quantized signal to obtain a single-bit quantized signal covariance matrix corresponding to a virtual uniform array $\mathbb{U}$; according to statistical characteristic analysis, based on the characteristic that the single-bit quantized signal covariance matrix $Q_{\mathbb{S}} = E[y(l)y^H(l)]$ is the same as a maximum linear independent set of an original unquantized signal covariance matrix $R_{\mathbb{S}}$, indicating that a rank of covariance matrix does not change in a single-bit quantization process, and the virtual domain augmented covariance matrix $\hat{Q}_{\mathbb{U}}$ corresponding to the single-bit quantized signal derived from $\hat{Q}_{\mathbb{S}}$ can be regarded as a sampling covariance matrix calculated from the single-bit receipt signal of the virtual uniform array $\mathbb{U}$, but some elements are missing; under an ideal condition that all elements are known, the covariance matrix will still retain the matrix rank information related to the incident signal source; based on statistical correlation analysis among the above statistics, the reconstruction problem of augmented covariance matrix can be constrained and optimized by using low rank characteristics of the covariance matrix, and then the following optimization problem for virtual domain statistics reconstruction of single-bit quantized signal is constructed taking $q_\mathbb{U}$ as an optimization target:

$$q_\mathbb{U}^\star = \arg\min_{q_\mathbb{U} \in \mathbb{C}^{|\mathbb{U}|}} \|\mathcal{P}_\Omega(Toep(q_\mathbb{U})) - Q_\mathbb{U}\|_F + \lambda \cdot \text{rank}(Toep(q_\mathbb{U}))$$

subject to $Toep(q_\mathbb{U}) \succeq 0$, wherein, $P_\Omega(\cdot)$ represents a projection operation used to select the element in $Toep(q\mathbb{U})$ corresponding to the position of $\hat{Q}\mathbb{U}$ non-zero elements for fitting, $\lambda$ is a user adjustment parameter $Toep(q\mathbb{U}) \geq 0$ is a positive semi-definite matrix constraint item, $\|\cdot\|_F$ represents a Frobenius norm, rank$(\cdot)$ represents the rank of the matrix; the single-bit quantized signal covariance matrix $Toep(q^*\mathbb{U})$ corresponding to the virtual uniform array $\mathbb{U}$ can be obtained by solving the above optimization problem; and (6) performing direction-of-arrival estimation by utilizing the optimized single-bit quantized signal covariance matrix $Toep(q^*\mathbb{U})$ corresponding to the virtual uniform array $\mathbb{U}$.

2. Further, the coprime array in step (1) can be arranged as follows: firstly, a pair of coprime integers M and N are selected, and then a pair of sparse uniform linear subarrays are constructed, wherein the first subarray contains M antenna elements with a spacing of Nd and positions of $\mathbb{S}_1 = \{0, Nd, \ldots, (M-1)Nd\}$, the second subarray contains N antenna elements with a spacing of Md and positions of $\mathbb{S}_2 = \{0, Md, \ldots, (N-1)Md\}$; then, the two sub-arrays are combined according to a way that the first array elements overlap, so as to obtain a non-uniform coprime array $\mathbb{S} = \mathbb{S}_1 + \mathbb{S}_2$ actually containing M+N−1 physical antenna elements.

3. Further, an optimal solution of the optimization problem in step (5) is obtained by using convex relaxation technique, and introducing a convex function term trace $(Toep(q\mathbb{U}))$ to replace a penalty term rank$(Toep(q\mathbb{U}))$ in the optimization problem, wherein trace$(\cdot)$ represents a trace of the matrix, and then efficiently solving the optimization problem through various interior point method tools such as CVX.

4. Further, the optimization problem in step (5) can be solved by ADMM, global optimization, approximate approximation or other methods to obtain the covariance matrix $Toep(q^*\mathbb{U})$ of single-bit quantized signal corresponding to the virtual uniform array $\mathbb{U}$.

5. Further, the direction-of-arrival estimation in step (6) can be performed by the following method: based on the obtained $Toep(q^*\mathbb{U})$ single-bit receipt signal corresponding to the virtual uniform array $\cup$, the direction-of-arrival estimation can be performed by calculating a following spatial spectrum:

$$f|(\theta) = \frac{\|a_\mathbb{U}(\theta)\|^2}{a_\mathbb{U}^H(\theta) \text{span}(Toep(q_\mathbb{U}^\star)) \text{span}(Toep(q_\mathbb{U}^\star))^H a_\mathbb{U}(\theta)}, \theta \in [-90°, 90°],$$

wherein, $a\mathbb{U}(\theta)$ is a steering vector of the virtual uniform array $\cup$ corresponding to the angle $\mu$; span$(\cdot)$ operation is used to collect eigenvectors corresponding to all eigenvalues except the largest K eigenvalues of corresponding matrix, $\|\cdot\|$ represents the Euclidean norm; finding all the maximum points in the spatial spectrum $f(\theta)$, $\theta \in [-90°, 90°]$, sorting each maximum point according to the size of a response value $f(\theta)$, and taking an angle value $\theta$ corresponding to the largest K maximum points of the response value as an result of the direction-of-arrival estimation.

6. Further, the direction-of-arrival estimation in step (6) can be processed by traditional Nyquist methods, such as subspace method, sparse method, optimization solution method and the like, based on the virtual domain augmented covariance matrix $Toep(q^*\mathbb{U})$ corresponding to the obtained single-bit quantized signal, to achieve the direction-of-arrival estimation.

Compared with the prior art, the present invention has the following advantages:

(1) The present invention makes full use of the advantage that the coprime array can increase the degree of freedom of direction-of-arrival estimation, derives the signal received by the single-bit coprime array to the virtual domain, and designs the optimization problem based on virtual domain signal processing on the basis of constructing the statistical characteristics of the virtual domain with the unquantized signal, thus realizing that the number of distinguishable incident signal sources in direction-of-arrival estimation is larger than the number of physical antenna elements, improving the degree of freedom and reducing the computational complexity.

(2) The present invention designs the direction-of-arrival estimation method based on the signal model modeling of single-bit quantized signal, and integrates the performance advantages of coprime array signal processing, which has important significance in the aspects of antenna deployment cost, system operation power consumption, data processing efficiency and the like in practical application.

(3) The present invention designs the direction-of-arrival estimation method specifically for the coprime array, fully considers the characteristic that the virtual array corresponding to the coprime array is a non-uniform array, realizes the effective utilization of all non-uniform virtual array elements through the statistics reconstruction of the quantized signal virtual domain, and avoids the problems of performance loss and model mismatch caused by the non-uniformity of the virtual array.

DESCRIPTION OF THE EMBODIMENTS

The technical schemes and effects of the present invention will be further described in detail below with reference to the drawings.

Figure 1:
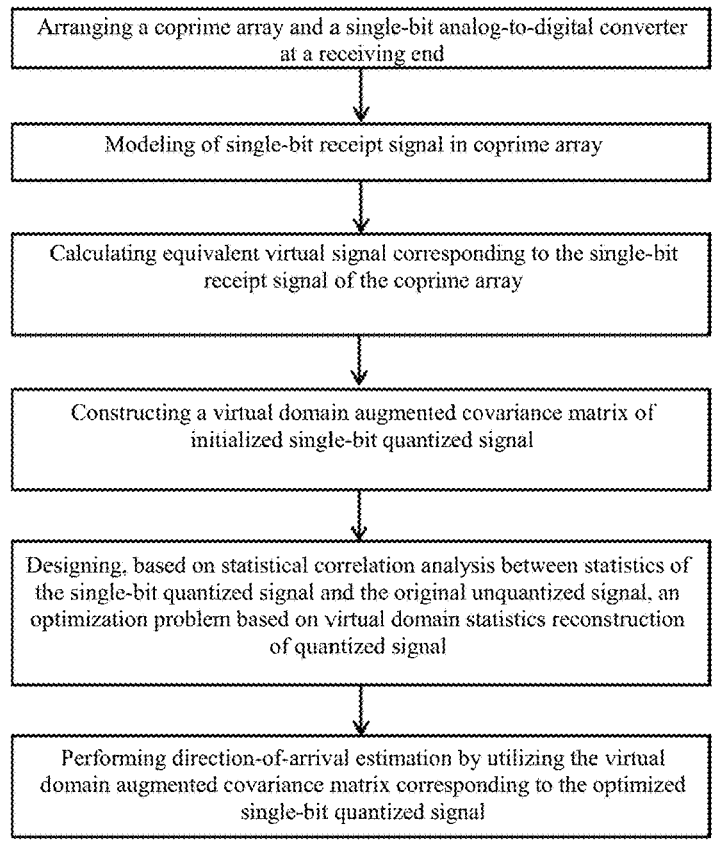
FIG. 1 is an overall flow diagram of the present invention.
Figure 2:
FIG. 2 is a schematic structural diagram of a pair of sparse uniform sub-arrays forming a coprime array according to the present invention.
Figure 3:
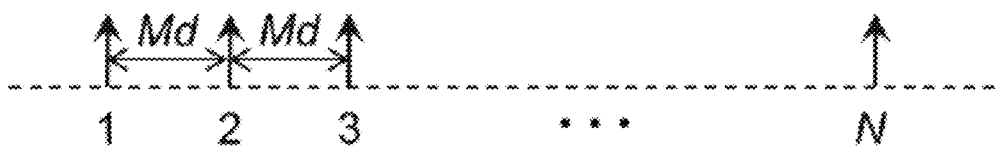
FIG. 3 is a schematic structural diagram of a coprime array according to the present invention.
Figure 3:
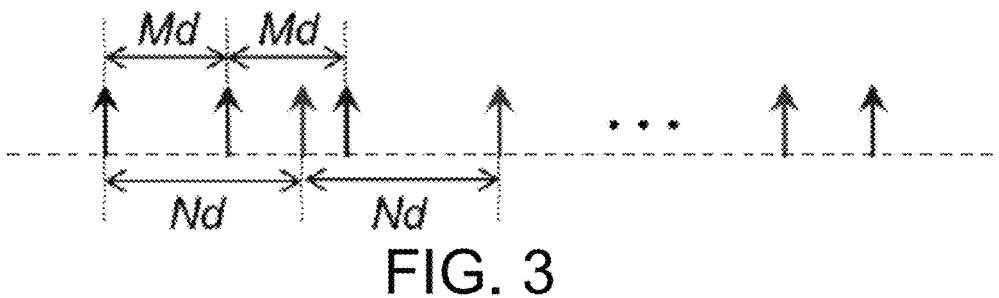

For the application of direction-of-arrival estimation technology in practical systems, especially for the application of the new generation of wireless communication systems characterized by large-scale antenna systems, the existing direction-of-arrival estimation methods face a series of challenges, such as limited degree of freedom, high system deployment cost and operation power consumption, large amount of data and complicated calculation. In order to overcome the above challenges, the present invention provides a method for estimating the direction-of-arrival of a coprime array based on virtual domain statistics reconstruction of single-bit quantized signal by integrating the advantages of coprime array signal processing and single-bit signal processing. Referring to FIG. 1, the implementation steps of the present invention are as follows:

Step 1: Use M+N−1 physical antenna elements to construct a coprime array at the receiving end, and each receiving end antenna is equipped with a single-bit analog-to-digital converter for signal reception. firstly, a pair of coprime integers M and N are selected, and then a pair of sparse uniform linear subarrays are constructed, wherein the first subarray contains M antenna elements with a spacing of Nd and positions of $\mathbb{S}_1=\{0, Nd, \ldots, (M-1)Nd\}$, the second subarray contains N antenna elements with a spacing of Md and positions of $\mathbb{S}_2=\{0, Md, \ldots, (N-1)Md\}$; then, the two sub-arrays are combined according to a way that the first array elements overlap, so as to obtain a non-uniform coprime array $\mathbb{S}=\mathbb{S}_1+\mathbb{S}_2$ actually containing M+N−1 physical antenna elements. Each receiving antenna is equipped with a single-bit analog-to-digital converter, which is used for binary quantization of the receipt signal.

Step 2: Modeling an single-bit receipt signal of the coprime array. Assuming that there are K far-field narrowband incoherent signal sources from directions $\theta_1, \theta_2, \ldots, \theta_K$, receiving an incident signal by adopting the coprime array and the single-bit analog-to-digital converter constructed in step (1), and obtaining the single-bit receipt signal $y(l) \in \mathbb{C}^{M+N-1}$ $y(l) \in \mathbb{C}^{M+N-1}$ of the coprime array at the lth time, wherein the modeling is $$y(l) = Q(x(l)) = Q\left(\sum_{k=1}^{K} a_{\mathbb{S}}(\theta_k)s_k(l) + n_{\mathbb{S}}(l)\right),$$

wherein, $\mathcal{Q}(\cdot)$ is a single-bit quantization operator, $x(l)$ is an unquantized original receipt signal of the coprime array, $s_k(l)$ is a waveform of a $k^{th}$ signal, $n_{\mathbb{S}}(l)$ is a noise item independent of each signal source, and $a_{\mathbb{S}}(\theta k)$ is a steering vector of the coprime array $\mathbb{S}$ corresponding to the direction $\theta_k$, expressed as $$a\mathbb{S}(\theta_k) = [1, e^{-j\pi u_2 sin(\theta_k)}, \ldots, e^{-j\pi u_{M+N-1} sin(\theta_k)}]^T,$$

wherein, $u_i$, i=1, 2, . . . , M+N−1 represents an actual position of the $i^{th}$ physical antenna element in the coprime array, and $u_1$=0, $j=\sqrt{-1}$, $[\cdot]^T$ represents a transposition operation, and a sampling covariance matrix $\hat{Q}_{\mathbb{S}}$ of the single-bit receipt signal of the coprime array is obtained by using collected L sampling snapshots, expressed as $$\hat{Q}_{\mathbb{S}} = \frac{1}{L}\sum_{l=1}^{L} y(l)y^H(l),$$

wherein $(\cdot)_H$ represents conjugate transpose.

Step 3: Calculating an equivalent virtual signal corresponding to the single-bit receipt signal of the coprime array. Vectorizing the sampling covariance matrix $\hat{Q}_{\mathbb{S}}$ of the single-bit receipt signal of the coprime array, and obtaining the equivalent receipt signal $\hat{q}_{\mathbb{D}}$ of a virtual array corresponding to the single-bit quantized signal, expressed as $$\hat{q}_{\mathbb{D}} = vec(\hat{Q}_{\mathbb{S}}) = \frac{2}{\pi}\left(\arcsin\left(\left(\Sigma^{-\frac{1}{2}} \otimes \Sigma^{-\frac{1}{2}}\right)\mathcal{R}(r_{\mathbb{D}})\right) + j\cdot\arcsin\left(\left(\Sigma^{-\frac{1}{2}} \otimes \Sigma^{-\frac{1}{2}}\right)\mathcal{I}(r_{\mathbb{D}})\right)\right),$$

corresponding to a non-uniform virtual array, $$\mathbb{D} = \{v_i - v_j | v_i, v_j \in \mathbb{S}\},$$

wherein, vec(·) represents a vectorization operation, that is, columns in the matrix are stacked in sequence to form a new vector, $\Sigma = diag(R_{\mathbb{S}})$, $R_{\mathbb{S}} = E[x(l)x^H(l)]$ is the covariance matrix of the receipt signal of a unquantized original coprime array, diag(·) represents operation of taking diagonal elements to form a diagonal matrix, E[·] represents taking expectation operation, $\otimes$ represents Kronecker product, $\mathcal{R}(\cdot)$ represents taking real part operation, $\mathcal{I}(\cdot)$ represents taking imaginary part operation, $$r_{\mathbb{D}} = \sum_{k=1}^{K} \sigma_k^2 a_{\mathbb{D}}(\theta_k) + \sigma_n^2 vec(I),$$

wherein, $\sigma_k^2$ represents power of the $k^{th}$ signal source, $\sigma_n^2$ represents noise power, I is an identity matrix, a $\mathbb{D}(\theta_k)$ is a steering vector of a non-uniform virtual array $\mathbb{D}$ corresponding to the direction $\theta_k$, and is calculated as a $\mathbb{D}(\theta_k)$=a* $\mathbb{S}(\theta_k) \otimes a\mathbb{S}(\theta_k)$, wherein (·)* is conjugate operation.

Step 4: Constructing a virtual domain augmented covariance matrix of an initialized single-bit quantized signal. In order to overcome a signal model mismatch problem caused by the non-uniform virtual array $\mathbb{D}$ of the coprime array, constructing a virtual domain uniform linear array $\mathbb{U}$ with a same aperture as a positive half axis of the non-uniform virtual array $\mathbb{D}$ and a spacing d, wherein the unit spacing d is half of the wavelength of incident narrowband signal, expressed as $$\mathbb{U} = \{ud | u=0,1,2, \ldots, max(\mathbb{D})/d\},$$

wherein, max(·) represents an operation of taking the set maximum, correspondingly, the equivalent virtual signal $\hat{q}$ $\mathbb{U} \in \mathbb{C}^{|\mathbb{U}|}$ corresponding to the virtual domain uniform linear array is obtained by the following method: for the equivalent virtual signal corresponding virtual array element position corresponding to $\hat{q}\mathbb{U}$, if the virtual array element position is included in the non-uniform virtual array $\mathbb{D}$, the equivalent virtual signal at this position is the same as a virtual signal corresponding to the corresponding virtual array element position in $\hat{q}\mathbb{D}$; the equivalent virtual signal corresponding to discontinuous virtual array elements in the remaining non-uniform virtual arrays $\mathbb{D}$ are set to zero, and then virtual domain augmented covariance matrix of the initialized single-bit quantized signal can be constructed as $$\hat{Q}\mathbb{U} = Toep(\hat{q}\mathbb{U}),$$

wherein, Toep(·) represents that a vector taken is the first column of the Hermitian Toeplitz matrix.

Step 5: designing, based on statistical correlation analysis between statistics of the single-bit quantized signal and the original unquantized signal, an optimization problem based on virtual domain statistics reconstruction of quantized signal to obtain a single-bit quantized signal covariance matrix corresponding to a virtual uniform array $\mathbb{U}$; according to statistical characteristic analysis, based on the characteristic that the single-bit quantized signal covariance matrix $Q\mathbb{S} = E[y(l)y^H(l)]$ is the same as a maximum linear independent set of an original unquantized signal covariance matrix $R\mathbb{S}$, indicating that a rank of covariance matrix does not change in a single-bit quantization process, and the virtual domain augmented covariance matrix $\hat{Q}\mathbb{U}$ corresponding to the single-bit quantized signal derived from $\hat{Q}\mathbb{S}$ can be regarded as a sampling covariance matrix calculated from the single-bit receipt signal of the virtual uniform array $\mathbb{U}$, but some elements are missing; under an ideal condition that all elements are known, the covariance matrix will still retain the matrix rank information related to the incident signal source; based on statistical correlation analysis among the above statistics, the reconstruction problem of augmented covariance matrix can be constrained and optimized by using low rank characteristics of the covariance matrix, and then the following optimization problem for virtual domain statistics reconstruction of single-bit quantized signal is constructed taking $q\mathbb{U}$ as an optimization target:

$$q_\mathbb{U}^* = \arg \min_{q_\mathbb{U} \in C^{|\mathbb{U}|}} \|\mathcal{P}_\Omega(Toep(q_\mathbb{U})) - Q_\mathbb{U}\|_F + \lambda \cdot \text{rank}(Toep(q_\mathbb{U}))$$

subject to $Toep(q_\mathbb{U}) \succeq 0$, wherein, $P_\Omega(\cdot)$ represents a projection operation used to select the element in $Toep(q\mathbb{U})$ corresponding to the position of $\hat{Q}\mathbb{U}$ non-zero elements for fitting, $\lambda$ is a user adjustment parameter $Toep(q\mathbb{U}) \succeq 0$ is a positive semi-definite matrix constraint item, $\|\cdot\|_F$ represents a Frobenius norm, rank(·) represents the rank of the matrix.

The above optimization problems can be solved by introducing various convex relaxation techniques, for example, by replacing the penalty term rank(Toep(q$\mathbb{U}$)) in the above optimization problems with the convex function term trace (Toep(q$\mathbb{U}$)), where trace(·) represents the trace of matrix, then it can be solved by various interior point methods such as CVX. In addition, the above optimization problems can also be solved by ADMM, global optimization, approximate approximation or other methods to obtain the covariance matrix Toep(q*$\mathbb{U}$) of single-bit quantized signals corresponding to the virtual uniform array $\mathbb{U}$.

Step 6: Estimating the direction-of-arrival by using the virtual domain augmented covariance matrix corresponding to the optimized single-bit quantized signal. Based on the obtained Toep(q*$\mathbb{U}$) single-bit receipt signal corresponding to the virtual uniform array $\cup$, the direction-of-arrival estimation can be performed by calculating a following spatial spectrum:

$$f|(\theta) = \frac{\|a_\mathbb{U}(\theta)\|^2}{a_\mathbb{U}^H(\theta)\text{span}(Toep(q_\mathbb{U}^*))\text{span}(Toep(q_\mathbb{U}^*))^H a_\mathbb{U}(\theta)}, \theta \in [-90°, 90°],$$

wherein, $a\mathbb{U}(\theta)$ is a steering vector of the virtual uniform array $\cup$ corresponding to the angle $\mu$; span(·) operation is used to collect eigenvectors corresponding to all eigenvalues except the largest K eigenvalues of corresponding matrix, $\|\cdot\|$ represents the Euclidean norm; finding all the maximum points in the spatial spectrum $f(\theta)$, $\theta \in [-90°, 90°]$, sorting each maximum point according to the size of a response value $f(\theta)$, and taking an angle value $\theta$ corresponding to the largest K maximum points of the response value as an result of the direction-of-arrival estimation.

In addition, the direction-of-arrival estimation in step (6) can be processed by traditional Nyquist methods, such as subspace method, sparse method, optimization solution method and the like, based on the virtual domain augmented covariance matrix Toep(q*$\mathbb{U}$) corresponding to the obtained single-bit quantized signal, to achieve the direction-of-arrival estimation.

On the one hand, the present invention makes full use of the advantages of coprime array virtual domain signal processing, makes full use of all discontinuous virtual array elements, and at the same time, realizes the improvement of direction-of-arrival estimation degree of freedom from $\mathcal{O}(M+N)$ to $\mathcal{O}(MN)$, so that compared with the traditional Nyquist method, the provided method can estimate more incident signal sources under the same number of antennas, reduces the number of radio frequency channels in hardware deployment, and reduces the data scale and computational complexity of receipt signals. On the other hand, the present invention realizes the sparse array virtual domain signal processing based on the single-bit quantized signal by using the single-bit signal processing technology, and performs the direction-of-arrival estimation efficiently by using the covariance rectangle of the single-bit quantized signal corresponding to the augmented virtual array according to the statistical relevance analysis of the quantized signal statistics. At the same time, the method for estimating the direction-of-arrival of single bit in the present invention reduces the average power consumption from several watts for mainstream 12-16-bit analog-to-digital converters in the existing system to several milliwatts, thus greatly reducing the power consumption of the system and avoiding the adverse influence caused by the error between idealized modeling and limited precision quantization of the traditional method.

The effect of the provided method will be further described with a simulation example.

Figure 4:
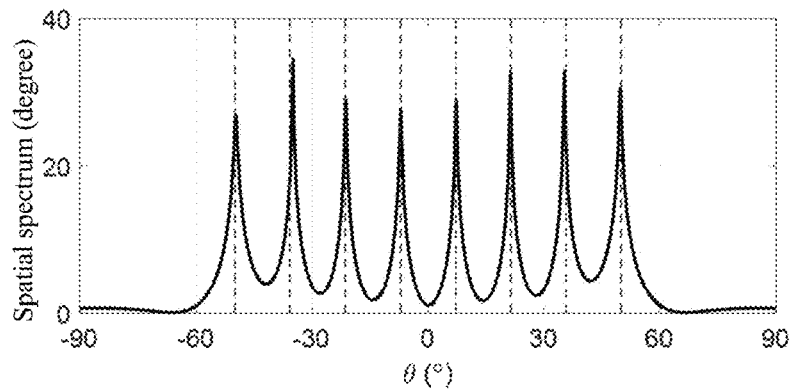
FIG. 4 is a spatial spectrum diagram according to the method provided by the present invention, with K=8.
Figure 5:
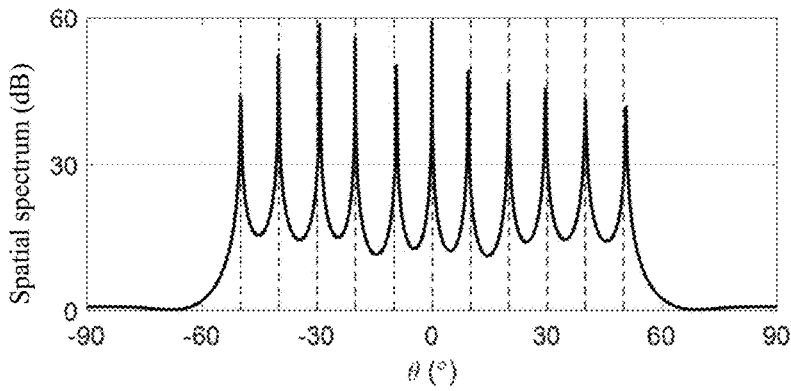
FIG. 5 is a spatial spectrum diagram according to the method provided by the present invention, with K=11.

Simulation example 1: The parameters of the coprime array are selected as M=3 and N=5, that is, the coprime array of the architecture contains $|\mathbb{S}|=7$ antenna elements. It is assumed that the incident direction of the incident narrowband signal is uniformly distributed in [−50°, 50°], the signal-to-noise ratio is 0 dB, the sampling snapshot number is L=500, and the user adjustment parameter $\lambda$ is 0.25. The spatial spectrums of the method for estimating the direction-of-arrival of a coprime array based on virtual domain statistics reconstruction of single-bit quantized signal under the underdetermined conditions K=$|\mathbb{S}|+1=8$ and K=$|\mathbb{D}|$ are shown in FIG. 4 and FIG. 5, respectively, where the dashed line represents the real direction-of-arrival of the incident signal. It can be seen from the simulation results that the provided method can effectively distinguish all incident signal sources under the above two conditions, which shows that the degree of freedom is still improved under the background of single-bit quantization signal processing. In addition, the results shown in FIG. 5 further illustrate that the present invention can effectively utilize all discontinuous array elements in the non-uniform array to process Nyquist signals in the virtual domain, thereby achieving the maximum degree of freedom performance.

Figure 6:
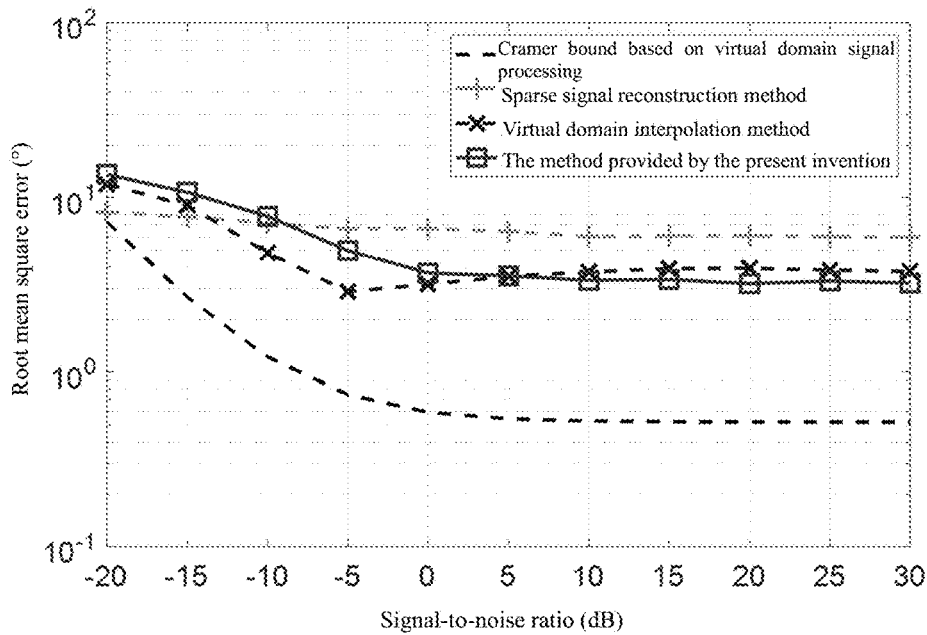
FIG. 6 is a performance comparison diagram of the root mean square error changing with the signal-to-noise ratio according to the method provided by the present invention.

Simulation example 2: The parameters of the coprime array are selected as M=3 and N=5, that is, the coprime array of the architecture contains $|\mathbb{S}|$=7 antenna elements. It is assumed that the K=10>$|\mathbb{S}|$ incident directions of narrowband incident signals are uniformly distributed in [−50°, 50°], the sampling snapshot number is L=500, and the user adjustment parameter λ is 0.25. A schematic diagram of the performance comparison of the root mean square error versus the signal-to-noise ratio between the method provided by the present invention and the existing sparse signal reconstruction and virtual domain interpolation methods based on non-quantized signals is shown in FIG. 6, in which the pre-defined space grid point spacing for sparse reconstruction and spectral peak search in the contrast method is 0.1, and the root mean square error is obtained by averaging 1000 Monte Carlo tests for each SNR simulation parameter setting. At the same time, the Cramer bound based on virtual domain signal processing is also given to represent the optimal value. It can be seen from the comparison results shown in FIG. 6 that when the signal-to-noise ratio is greater than 5 dB, the method provided by the present invention can still obtain better performance than the non-quantized signal processing method under the condition of single-bit quantization, and keep the same performance trend as the Cramer-Rao bound of virtual domain signal processing.

In summary, the present invention mainly overcomes the shortcomings of the prior art in terms of degree of freedom and computational complexity, system deployment cost, power consumption, data scale and the like. On the one hand, the virtual domain signal processing characteristics of the coprime array are fully utilized to realize the increase of freedom; on the other hand, based on the design optimization problem of single-bit quantization signal modeling and statistical correlation analysis, the advantages of single-bit signal processing and coprime array signal processing are integrated, which has broad application prospects in practical applications for new generation wireless communication systems, passive positioning, target detection and other applications.

What is claimed is:

1. A method for estimating the direction-of-arrival of a coprime array based on virtual domain statistics reconstruction of single-bit quantized signal, comprising the following steps:

(1) arranging a coprime array $\mathbb{S}$ at a receiving end using M+N−1 antennas, each array element of the coprime array being connected with a single-bit analog-to-digital converter for single-bit quantization of receipt signal, wherein M and N are coprime integers;

(2) receiving the receipt signal by the coprime array, and modeling a single-bit receipt signal of the coprime array by performing steps comprising: assuming that there are K far-field narrowband incoherent signal sources from directions $\theta_1, \theta_2, \ldots, \theta_K$, wherein K is an integer and greater than 0, and the receipt signal comprises an incident signal received by adopting the coprime array and the single-bit analog-to-digital converter constructed in step (1), and obtaining the single-bit receipt signal $y(l) \in \mathbb{C}^{M+N-1}$ of the coprime array at the lth time, wherein the modeling is $$y(l) = Q(x(l)) = Q\left(\sum_{k=1}^{K} a_S(\theta_k)s_k(l) + n_S(l)\right),$$

wherein, $Q$ (·) is a single-bit quantization operator, x(l) is the unquantized original receipt signal of the coprime array, $s_k(l)$ is a waveform of a $k^{th}$ signal, $n_\mathbb{S}(l)$ is a noise item independent of each signal source, and a $\mathbb{S}$ ($\theta_k$) is a steering vector of the coprime array $\mathbb{S}$ corresponding to the direction $\theta_k$, expressed as $$a\mathbb{S}(\theta k)=[1,e^{-j\pi u_2 sin(\theta_k)},\ldots,e^{-j\pi u_{M+N-1}sin(\theta_k)}]^T,$$

wherein, $u_i$, i=1, 2, . . . , M+N−1 represents an actual position of the $i^{th}$ physical antenna element in the coprime array, and $u_1$=0, j=$\sqrt{-1}$, $[\cdot]^T$ represents a transposition operation, and a sampling covariance matrix $\hat{Q}$ $\mathbb{S}$ of the single-bit receipt signal of the coprime array is obtained by using collected L sampling snapshots, expressed as $$\hat{Q}_S = \frac{1}{L}\sum_{l=1}^{L} y(l)y^H(l),$$

wherein $(\cdot)^H$ represents conjugate transpose;

(3) calculating an equivalent virtual signal corresponding to the single-bit receipt signal of the coprime array by performing steps comprising: vectorizing the sampling covariance matrix $\hat{Q}\mathbb{S}$ of the single-bit receipt signal of the coprime array, and obtaining the equivalent receipt signal $\hat{q}\mathbb{D}$ of a virtual array corresponding to the single-bit quantized signal, expressed as $$\hat{q}_\mathbb{D} = vec(\hat{Q}_S) = \frac{2}{\pi}\left(\arcsin\left(\left(\Sigma^{-\frac{1}{2}} \otimes \Sigma^{-\frac{1}{2}}\right)\mathcal{R}(r_\mathbb{D})\right) + j \cdot \arcsin\left(\left(\Sigma^{-\frac{1}{2}} \otimes \Sigma^{-\frac{1}{2}}\right)\mathcal{I}(r_\mathbb{D})\right)\right),$$

corresponding to a non-uniform virtual array, $\mathbb{D}=\{v_i-v_j|v_i,v_j\in \mathbb{S}\}$, wherein, vec(·) represents a vectorization operation, that is, columns in the matrix are stacked in sequence to form a new vector, $\Sigma$=diag(R$\mathbb{S}$), R$\mathbb{S}$ =E[x(l)x$^H$(l)] is the covariance matrix of the receipt signal of a unquantized original coprime array, diag(·) represents an operation of taking diagonal elements to form a diagonal matrix, E[·] represents taking expectation operation, $\otimes$ represents Kronecker product, $\mathcal{R}$ (·) represents taking real part operation, $\mathcal{I}$ (·) represents taking imaginary part operation, $$r_\mathbb{D} = \sum_{k=1}^{K}\sigma_k^2 a_D(\theta_k) + \sigma_n^2 vec(I),$$

wherein, $\sigma_k^2$ represents power of the $k^{th}$ signal source, $\sigma_n^2$ represents noise power, I is an identity matrix, a$\mathbb{D}$ ($\theta_k$) is a steering vector of a non-uniform virtual array $\mathbb{D}$ corresponding to the direction $\theta_k$, and is calculated as a$\mathbb{D}$ ($\theta_k$)=a*$\mathbb{S}$ ($\theta_k$)$\otimes$a$\mathbb{S}$ ($\theta_k$), wherein (·)* is a conjugate operation;

(4) constructing a virtual domain augmented covariance matrix of an initialized single-bit quantized signal by performing steps comprising: in order to overcome a signal model mismatch problem caused by the non-uniform virtual array $\mathbb{D}$ of the coprime array, constructing a virtual domain uniform linear array $\mathbb{U}$ with a same aperture as a positive half axis of the non-uniform virtual array $\mathbb{D}$ and a spacing d, wherein the unit spacing d is half of the wavelength of incident narrowband signal, expressed as $$\mathbb{U} = \{ud | u=0,1,2,\ldots,\max(\mathbb{D})/d\},$$

wherein, max(·) represents an operation of taking the set maximum, correspondingly, the equivalent virtual signal $\hat{q}\mathbb{U} \in \mathbb{C}^{|\mathbb{U}|}$ corresponding to the virtual domain uniform linear array is obtained by the following method: for the equivalent virtual signal corresponding virtual array element position corresponding to $\hat{q}\mathbb{U}$, if the virtual array element position is included in the non-uniform virtual array $\mathbb{D}$, the equivalent virtual signal at this position is the same as a virtual signal corresponding to the corresponding virtual array element position in $\hat{q}\mathbb{D}$; the equivalent virtual signal corresponding to discontinuous virtual array elements in the remaining non-uniform virtual arrays $\mathbb{D}$ are set to zero, and then a virtual domain augmented covariance matrix of the initialized single-bit quantized signal is constructed as $$\hat{Q}\mathbb{U} = \text{Toep}(\hat{q}\mathbb{U}),$$

wherein, Toep(·) represents that a vector taken is the first column of a Hermitian Toeplitz matrix;

(5) designing, based on statistical correlation analysis between statistics of the single-bit quantized signal and the original unquantized signal, an optimization problem based on virtual domain statistics reconstruction of quantized signal to obtain a single-bit quantized signal covariance matrix corresponding to a virtual uniform array $\mathbb{U}$, wherein the optimization problem is designed as follow: according to statistical characteristic analysis, based on the characteristic that the single-bit quantized signal covariance matrix $Q\mathbb{S} = E[y(l)y^H(l)]$ is the same as a maximum linear independent set of an original unquantized signal covariance matrix $R\mathbb{S}$, indicating that a rank of covariance matrix does not change in a single-bit quantization process, and the virtual domain augmented covariance matrix $\hat{Q}\mathbb{U}$ corresponding to the single-bit quantized signal derived from $\hat{Q}\mathbb{S}$ is regarded as a sampling covariance matrix calculated from the single-bit receipt signal of the virtual uniform array $\mathbb{U}$, but some elements are missing; under an ideal condition that all elements are known, the covariance matrix will still retain the matrix rank information related to the incident signal source; based on statistical correlation analysis among the above statistics, the reconstruction problem of augmented covariance matrix is constrained and optimized by using low rank characteristics of the covariance matrix, and then the following optimization problem for virtual domain statistics reconstruction of single-bit quantized signal is constructed taking $q\mathbb{U}$ as an optimization target:

$$q_{\mathbb{U}}^* = \arg\min_{q_{\mathbb{U}} \in \mathbb{C}^{|\mathbb{U}|}} \|\mathcal{P}_\Omega(\text{Toep}(q_\mathbb{U})) - Q_\mathbb{U}\|_F + \lambda \cdot \text{rank}(\text{Toep}(q_\mathbb{U})) \text{ subject to } \text{Toep}(q_\mathbb{U}) \succeq 0,$$

wherein, $P_\Omega(\cdot)$ represents a projection operation used to select the element in Toep($q\mathbb{U}$) corresponding to the position of $\hat{Q}\mathbb{U}$ non-zero elements for fitting, $\lambda$ is a user adjustment parameter, Toep($q\mathbb{U}$) $\succeq 0$ is a positive semi-definite matrix constraint item, $\|\cdot\|_F$ represents a Frobenius norm, rank (·) represents the rank of the matrix; the single-bit quantized signal covariance matrix Toep($q^*\mathbb{U}$) corresponding to the virtual uniform array $\mathbb{U}$ is obtained by solving the above optimization problem; and (6) performing direction-of-arrival estimation to determine the direction-of-arrival of the receipt signal by utilizing the optimized single-bit quantized signal covariance matrix Toep($q^*\mathbb{U}$) corresponding to the virtual uniform array $\mathbb{U}$.

2. The method for estimating the direction-of-arrival of a coprime array based on virtual domain statistics reconstruction of single-bit quantized signal according to claim 1, wherein the coprime array in step (1) is arranged as follows: firstly, a pair of coprime integers M and N are selected, and then a pair of sparse uniform linear subarrays are constructed, wherein the first subarray contains M antenna elements with a spacing of Nd and positions of $\mathbb{S}_1 = \{0, Nd, \ldots, (M-1)Nd\}$, the second subarray contains N antenna elements with a spacing of Md and positions of $\mathbb{S}_2 = \{0, Md, \ldots, (N-1)Md\}$; then, the two sub-arrays are combined according to a way that the first array elements overlap, so as to obtain a non-uniform coprime array $\mathbb{S} = \mathbb{S}_1 + \mathbb{S}_2$ actually containing M+N−1 physical antenna elements.

3. The method for estimating the direction-of-arrival of a coprime array based on virtual domain statistics reconstruction of single-bit quantized signal according to claim 1, wherein an optimal solution of the optimization problem in step (5) is obtained by using convex relaxation technique, and introducing a convex function term trace(Toep($q\mathbb{U}$)) to replace a penalty term rank(Toep($q\mathbb{U}$)) in the optimization problem, wherein trace(·) represents a trace of the matrix, and then efficiently solving the optimization problem through various interior point method tools comprising CVX.

4. The method for estimating the direction-of-arrival of a coprime array based on virtual domain statistics reconstruction of single-bit quantized signal according to claim 1, wherein the optimization problem in step (5) is solved by alternating direction method of multipliers (ADMM), global optimization or an approximation algorithm to obtain the covariance matrix Toep($q^*\mathbb{U}$) of single-bit quantized signal corresponding to the virtual uniform array $\mathbb{U}$.

5. The method for estimating the direction-of-arrival of a coprime array based on virtual domain statistics reconstruction of single-bit quantized signal according to claim 1, wherein the direction-of-arrival estimation in step (6) is performed by the following method: based on the obtained Toep($q^*\mathbb{U}$) single-bit receipt signal corresponding to the virtual uniform array U, the direction-of-arrival estimation is performed by calculating a following spatial spectrum:

$$f|(\theta) = \frac{\|a_U(\theta)\|^2}{a_U^H(\theta)\text{span}(Toep(q_U^\star))\text{span}(Toep(q_U^\star))^H a_U(\theta)}, \theta \in [-90°, 90°],$$

wherein, $a_{\mathbb{U}}(\theta)$ is a steering vector of the virtual uniform array $\mathbb{U}$ corresponding to the angle μ; span(·) operation is used to collect eigenvectors corresponding to all eigenvalues except the largest K eigenvalues of corresponding matrix, $\|\cdot\|$ represents the Euclidean norm; finding all the maximum points in the spatial spectrum f(θ), θ∈[−90°, 90°], sorting each maximum point according to the size of a response value f(θ), and taking an angle value θ corresponding to the largest K maximum points of the response value as an result of the direction-of-arrival estimation.

6. The method for estimating the direction-of-arrival of a coprime array based on virtual domain statistics reconstruction of single-bit quantized signal according to claim wherein the direction-of-arrival estimation in step (6) is processed by a traditional Nyquist methods comprising a subspace method, a sparse method, or an optimization solution method, based on the virtual domain augmented covariance matrix $Toep(q^*_{\mathbb{U}})$ corresponding to the obtained single-bit quantized signal, to achieve the direction-of-arrival estimation.

\* \* \* \* \*